United States Patent
Yin et al.

(10) Patent No.: US 9,882,894 B2
(45) Date of Patent: Jan. 30, 2018

(54) SECURE AUTHENTICATION SERVICE

(71) Applicant: Verizon Patent and Licensing Inc., Arlington, VA (US)

(72) Inventors: Fenglin Yin, Lexington, MA (US); Jianxiu Hao, Acton, MA (US); Zhong Chen, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 110 days.

(21) Appl. No.: 14/969,187

(22) Filed: Dec. 15, 2015

(65) Prior Publication Data
US 2017/0171187 A1 Jun. 15, 2017

(51) Int. Cl.
*H04L 9/32* (2006.01)
*H04L 29/06* (2006.01)

(52) U.S. Cl.
CPC .......... *H04L 63/083* (2013.01); *H04L 9/3242* (2013.01); *H04L 9/3263* (2013.01); *H04L 63/10* (2013.01); *H04L 2209/24* (2013.01); *H04L 2209/72* (2013.01)

(58) Field of Classification Search
CPC ..... H04L 63/083; H04L 63/10; H04L 9/3242; H04L 9/3263; H04L 2209/72; H04L 2209/24
See application file for complete search history.

(56) References Cited

U.S. PATENT DOCUMENTS

| | | | | |
|---|---|---|---|---|
| 2005/0289350 A1* | 12/2005 | Schmidt-Karaca | ..... | G06F 21/31 713/176 |
| 2012/0066767 A1* | 3/2012 | Vimpari | ................ | H04L 9/0866 726/26 |
| 2013/0318354 A1* | 11/2013 | Entschew | ............. | G06F 21/645 713/175 |
| 2016/0072781 A1* | 3/2016 | Zhang | .................. | H04L 63/065 726/4 |
| 2016/0171187 A1* | 6/2016 | Durbha | ................... | G06F 21/10 726/29 |
| 2016/0337321 A1* | 11/2016 | Lin | ..................... | H04L 63/0428 |

* cited by examiner

*Primary Examiner* — Mohammed Waliullah

(57) ABSTRACT

A first device may receive a request from a second device. The request may include a device identifier associated with the second device. The request may be transmitted by the second device to obtain a signature, based on which to access a third device. The first device may determine that the device identifier is associated with a secure authentication service. The first device may generate a signature based on determining that the device identifier is associated with the secure authentication service. The first device may provide the signature to the third device. The signature may permit the third device to selectively permit or deny access by the second device based on a result of authenticating the signature. Access may be permitted when the third device successfully authenticates the signature, and access may be denied when the third device fails to authenticate the signature.

20 Claims, 14 Drawing Sheets

SECURE AUTHENTICATION SERVICE

BACKGROUND

An application that is running on user equipment (UE) may provide data to an application device via a cellular network (e.g., a long term evolution (LTE) network, a third generation (3G) network, a fourth generation (4G) network, etc.). The application device may require the UE to provide credentials before the application device connects with the UE. For example, the application device may require the credentials to establish a secure session with the UE, to determine whether the UE is permitted to connect with the application device, or the like.

DETAILED DESCRIPTION OF PREFERRED EMBODIMENTS

The following detailed description of example implementations refers to the accompanying drawings. The same reference numbers in different drawings may identify the same or similar elements.

A UE (e.g., a mobile phone, a tablet computer, a laptop computer, etc.) may execute an application. The application may provide information to an application device via a cellular network based on an application credential (e.g., a username, a password, a security key, etc.). For example, the UE, or a user of the UE, may provide the application credential, and the application device may exchange information with the UE after authenticating the application credential. Some applications may require an unusually high level of security in addition to the application credential (e.g., based on the application having access to sensitive information, etc.). As one possible example, the application may be used by a field technician to cause the application device to activate Internet of Things (IoT) devices that are installed by the field technician, which may require a high level of security to prevent a malicious party from subverting the IoT devices.

In cases where the application requires an unusually high level of security, the application may be executed on a proprietary UE, may connect with the application device via a virtual private network (VPN) connection, may use multi-factor authentication to control access to the application device, or the like. This may permit an application provider to ensure that unauthorized UEs do not access the application device using the application. However, in some cases, a proprietary UE for accessing the application device may be difficult or costly for an application provider to implement. Furthermore, in a situation where the UE is not a proprietary UE, credentials for accessing the application device (e.g., credentials to be provided by a user, credentials stored by the UE, etc.) may be easily compromised. In such cases, the application provider may want to provide a level of security similar to that of the proprietary UE and/or the VPN connection, while providing the application via a UE that may be widely available to consumers.

Implementations described herein enable a network device to control access to the application device based on device identifiers for UEs that are preemptively authorized, by the application provider, to access the application device. The network device may authenticate UEs based on device identifiers associated with the UEs, and may provide successfully authenticated UEs with a signature that the application device can authenticate. Based on authenticating the signature, the application device may permit the UE to access the application.

In this way, the network device reduces expense associated with implementing high-security communication protocols between a UE and an application device and improves security of the cellular network.

Figure 1A:
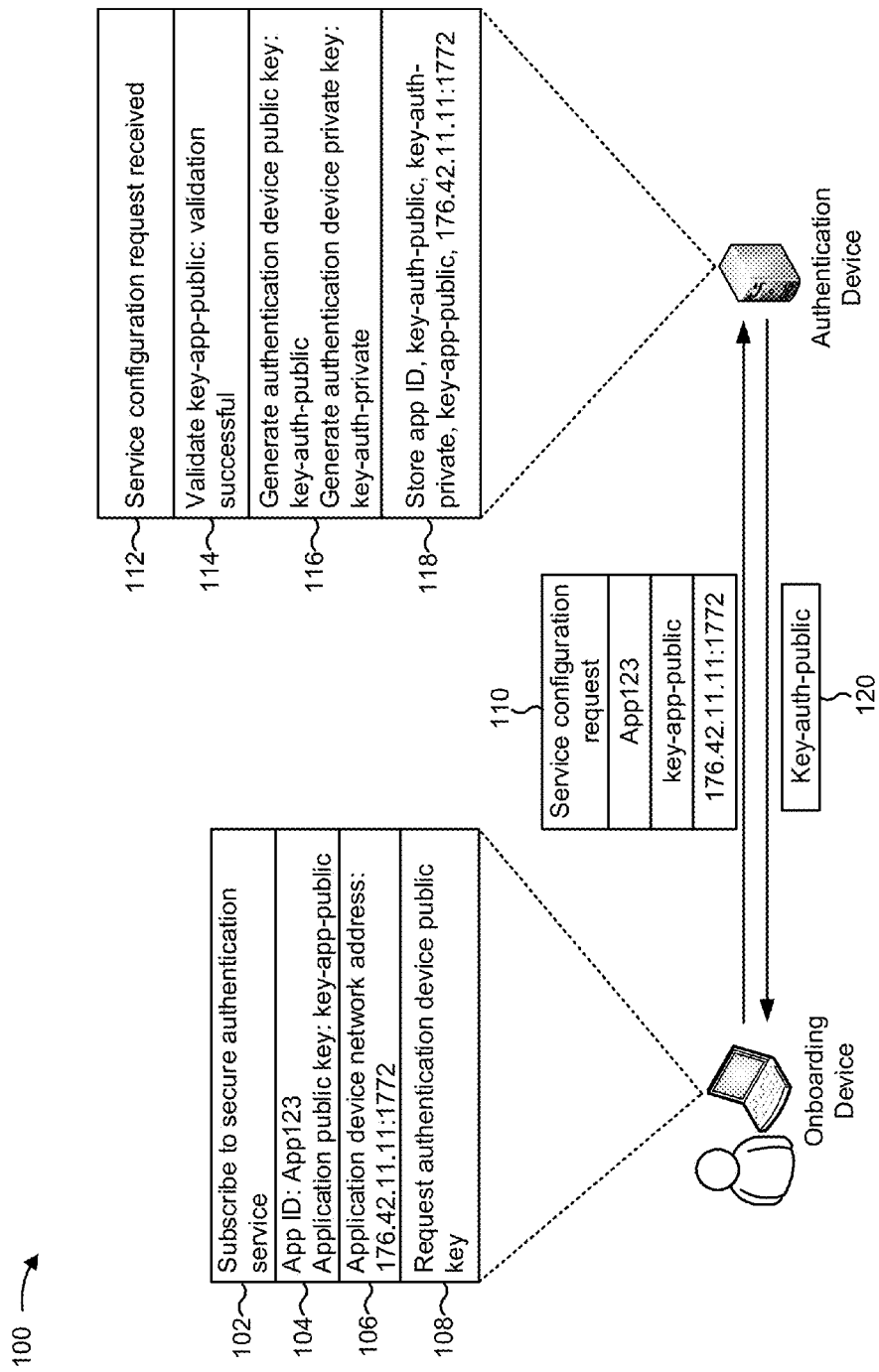
FIGS. 1A-1F are diagrams of an overview of an example implementation described herein.

FIGS. 1A-1F are diagrams of an overview of an example implementation 100 described herein. As shown in FIG. 1A, and by reference number 102, an onboarding device may subscribe to a secure authentication service. As shown by reference number 104, the onboarding device may receive an application identifier of App123, and may determine (e.g., generate, obtain, etc.) an application public key of key-app-public. As shown by reference number 106, the onboarding device may determine an application device network address (e.g., an Internet Protocol (IP) address and network port of 176.42.11.11:1772). As shown by reference number 108, the onboarding device may request an authentication device public key.

As shown by reference number 110, to request the authentication device public key, the onboarding device may provide a service configuration request to an authentication device. As further shown, the service configuration request may include the application identifier of App123, the application public key of key-app-public, and the application device network address. As shown by reference number 112, the authentication device may receive the service configuration request. As shown by reference number 114, the authentication device may validate the application public key. For example, the authentication device may validate the application public key based on a digital certificate received in association with the application public key, or the like.

As shown by reference number 116, the authentication device may generate an authentication device public/private key pair that includes an authentication device public key (e.g., key-auth-public) and an authentication device private key (e.g., key-auth-private). As shown by reference number 118, the authentication device may store the application identifier, the authentication device public key, the authentication device private key, the application public key, and the application device network address. As shown by reference number 120, the authentication device may provide the authentication device public key to the onboarding device.

Figure 1B:
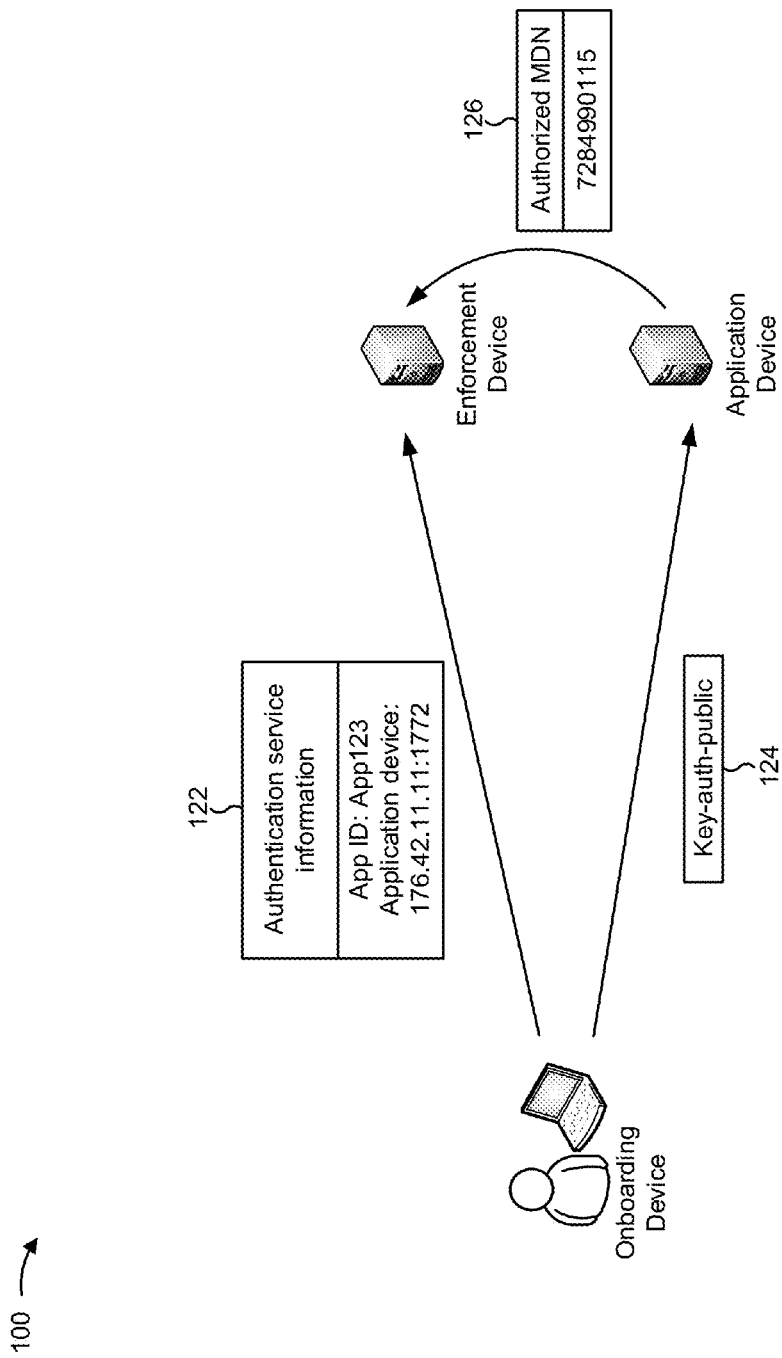

As shown in FIG. 1B, and by reference number 122, the onboarding device may provide authentication service information to an enforcement device. As further shown, the secure authentication service information may include the application identifier and the application device network address. As shown by reference number 124, the onboarding device may provide the authentication device public key to the application device. As shown by reference number 126, the application device may provide a list of authorized device identifiers (e.g., authorized mobile directory numbers (MDNs), etc.) to the enforcement device. Here, the application device provides an MDN of 7284990115, to cause the enforcement device to authorize a UE associated with the MDN of 7284990115 to access the application device, as described in more detail below.

Figure 1C:
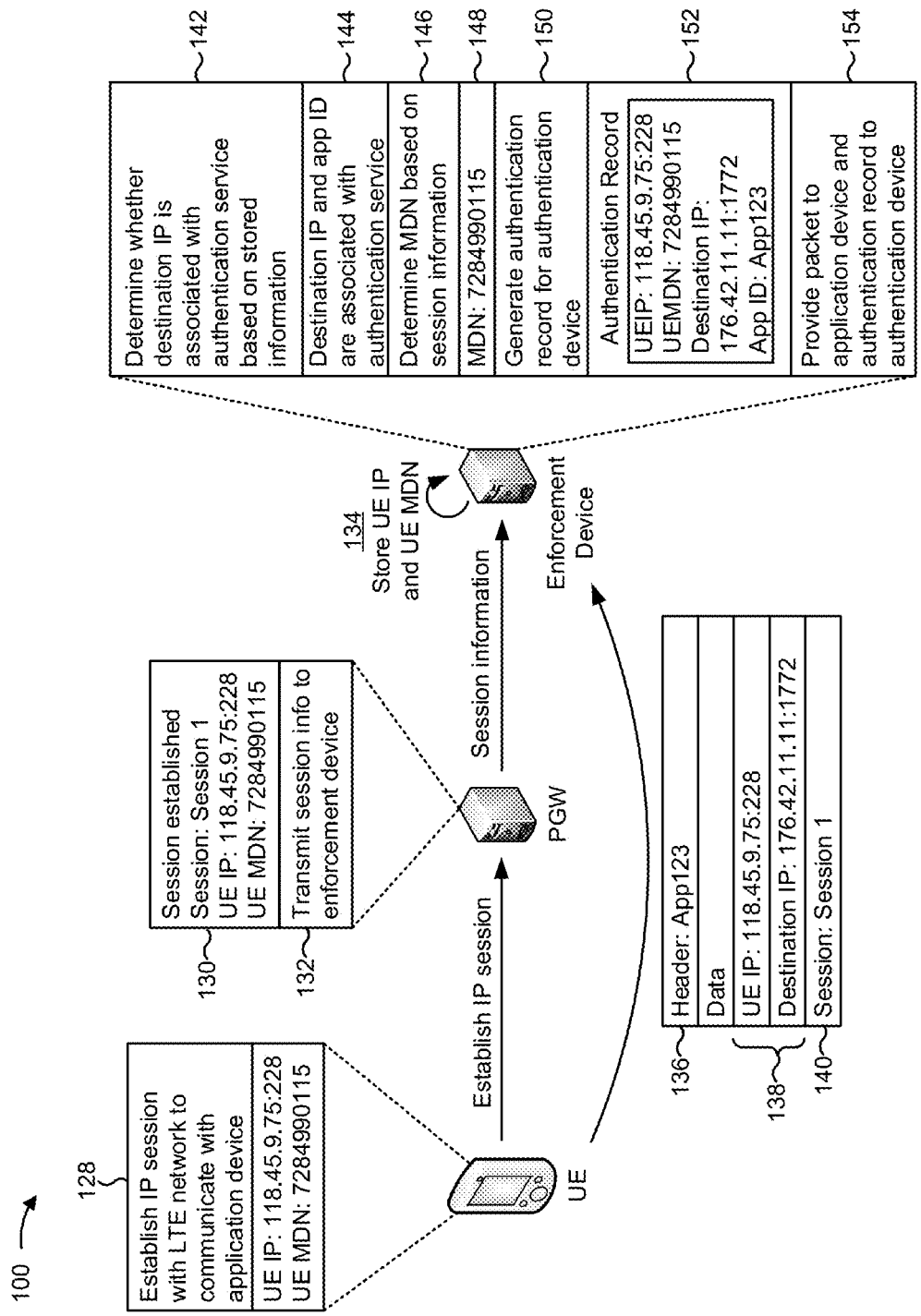

As shown in FIG. 1C, and by reference number 128, a UE may establish an Internet Protocol (IP) session with the cellular network to communicate with an application device. As further shown, the UE may be associated with the authorized MDN of 7284990115, and may be associated with a network address (e.g., a UE IP address and network port of 118.45.9.75:228). As shown by reference number 130, a packet data network (PDN) gateway (PGW) may establish a session with the UE. As further shown, the PGW may generate a session identifier that identifies the session (e.g., Session 1). As shown by reference number 132, the PGW may transmit session information to an enforcement device. The session information may include a session record that identifies information relating to the network session, as described in more detail elsewhere herein. As shown by reference number 134, the enforcement server may store information identifying the MDN associated with the UE and the network address associated with the UE.

As shown by reference number 136, the UE may transmit a packet to the enforcement device. For example, the enforcement device may receive the packet en route from the UE to the application device. As shown, the packet may include the application identifier of App123, and may include a data payload. As shown by reference number 138, the packet may include the UE network address and a network address associated with the application device (e.g., a destination network address of 176.42.11.11:1772, which matches the network address provided to the enforcement device in connection with reference number 122). As shown by reference number 140, the packet may include the session identifier of Session 1.

As shown by reference number 142, the enforcement device may determine whether the destination network address (e.g., 176.42.11.11:1772) is associated with a secure authentication service based on information stored by the enforcement device (e.g., information stored in connection with reference number 122). As shown by reference number 144, the enforcement device determines that the destination network address and the application identifier are associated with the secure authentication service. As shown by reference number 146, based on the session information received from the PGW 225 (e.g., the network session record), the enforcement device may identify the MDN associated with the UE. As shown by reference number 148, the MDN identified by the enforcement device based on the session information matches the MDN associated with the UE.

As shown by reference number 150, based on determining that the UE, the destination network address, and the application are associated with the secure authentication service, the enforcement device may generate an authentication record for use by the authentication device to authenticate the UE. As shown by reference number 152, the authentication record may include the network address associated with the UE 205 (e.g., 118.45.9.75:228), the MDN associated with the UE (e.g., 7284990115), the destination network address associated with the application device (e.g., 176.42.11.11:1772), and the application identifier. As shown by reference number 154, the enforcement device may provide the packet to the application server, and may provide the authentication record to the authentication device.

Figure 1D:
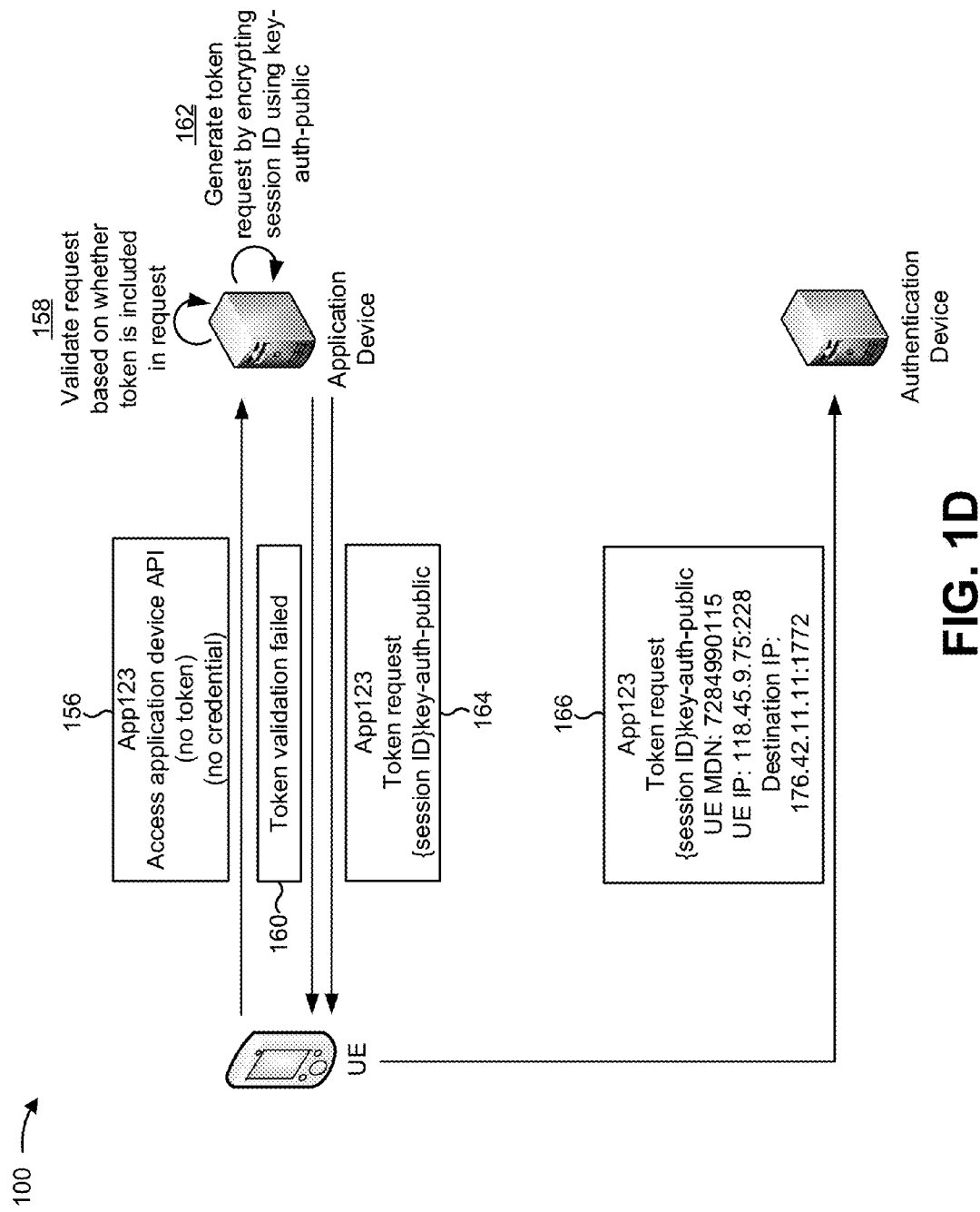

As shown in FIG. 1D, and by reference number 156, the UE may transmit an access request to access the application device (e.g., an application programming interface (API) hosted by the application device). As shown, the access request may not include a token, and may not include a credential for accessing the API. As shown by reference number 158, the application device may validate the request based on whether the token is included in the access request. Here, the application device fails to validate the access request. As shown by reference number 160, the application device may provide a response to the UE indicating that validation of the access request based on the token has failed.

As shown by reference number 162, the application device may generate a token request, which may include an encrypted session identifier. The application device may generate the encrypted session identifier by encrypting the session identifier associated with the network session (e.g., Session 1) using the authentication device public key. As shown by reference number 164, the application device may provide the token request to the UE. As shown by reference number 166, the UE may transmit the token request to the authentication device. As further shown, the UE may provide, with the token request, information identifying the MDN associated with the UE, the network address associated with the UE, and the network address associated with the application device.

Figure 1E:
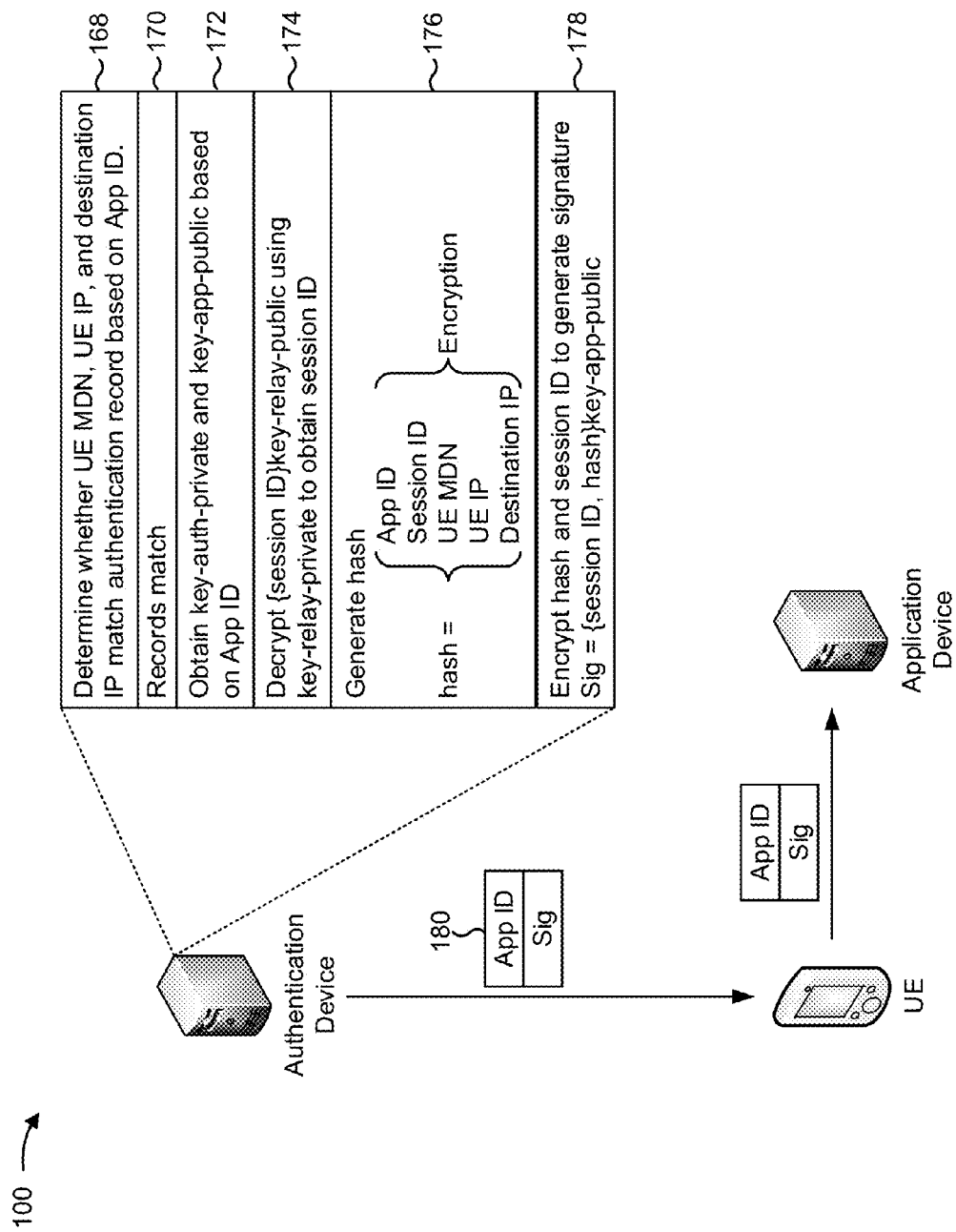

As shown in FIG. 1E, and by reference number 168, the authentication device may determine whether the MDN associated with the UE, the network address associated with the UE, and the network address associated with the application device match the authentication record associated with the application identifier of App123. As shown by reference number 170, the authentication device determines that the MDN, the network address associated with the UE, and the network address associated with the application device match the authentication record. As shown by reference number 172, the authentication device may obtain the authentication device private key and the application public key from storage based on the application identifier. As shown by reference number 174, the authentication device may decrypt the encrypted session identifier using the authentication device public key to obtain the session identifier of Session 1.

As shown by reference number 176, the authentication device may generate a hash for use by the application device to authenticate the UE. As shown, to generate the hash, the authentication device may perform an encryption operation on the application identifier, the session identifier, the MDN associated with the UE, the network address associated with the UE, and the network address associated with the application device. As shown by reference number 178, the application device may encrypt the hash and the session identifier, using the application public key, to generate a signature (e.g., "Sig"). As shown by reference number 180, the authentication device may provide the application identifier and the signature to the UE, and the UE may provide the application identifier and the signature to the application device.

Figure 1F:
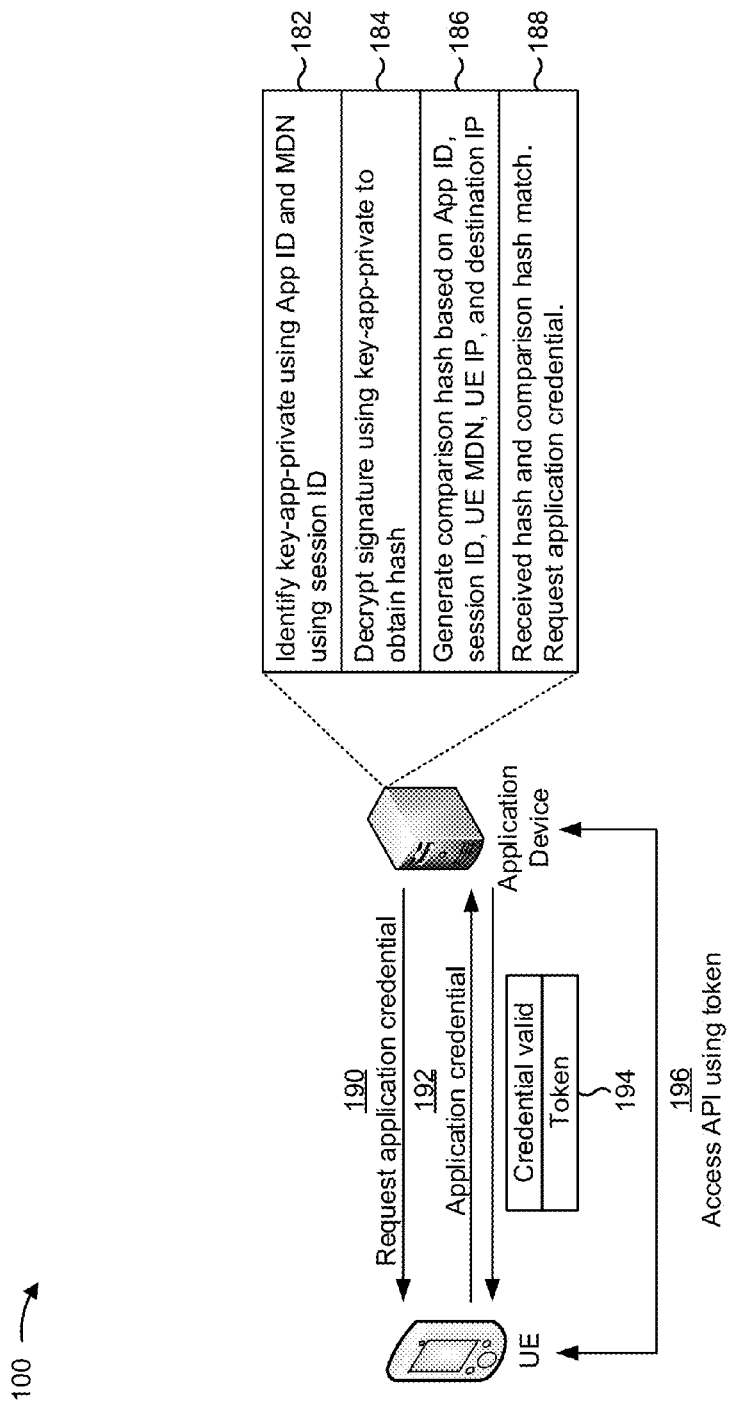

As shown in FIG. 1F, and by reference number 182, the application device may identify the application private key based on the application identifier, and may identify the MDN associated with the UE based on the session identifier. As shown by reference number 184, the application device may decrypt the signature using the application private key to obtain the hash. As shown by reference number 186, the application device may generate a comparison hash to compare with the received hash in order to validate the UE. As shown, the application device generates the comparison hash based on the application identifier, the session identifier, the MDN associated with the UE, the network address associated with the UE, and the network address associated with the application device. As shown by reference number 188, the application device determines that the received hash and the comparison hash match. In this way, the application device authenticates the UE based on a hash generated by the authentication device, which improves network security.

As shown by reference number 190, after authenticating the UE based on the signature, the application device may request an application credential from the UE. As shown by reference number 192, the UE may provide the application credential (e.g., based on a user input to an interface of the application, based on information stored by the UE, etc.). As shown by reference number 194, the application device may determine that the application credential is valid, and may provide the token for accessing the application device (e.g., the API). As shown by reference number 196, the UE may access the API using the token. In this way, the enforcement device and the authentication device improve network security by authenticating the UE, and by providing information for the application device to independently authenticate the UE.

As indicated above, FIGS. 1A-1F are provided merely as an example. Other examples are possible and may differ from what was described with regard to FIGS. 1A-1F.

Figure 2:
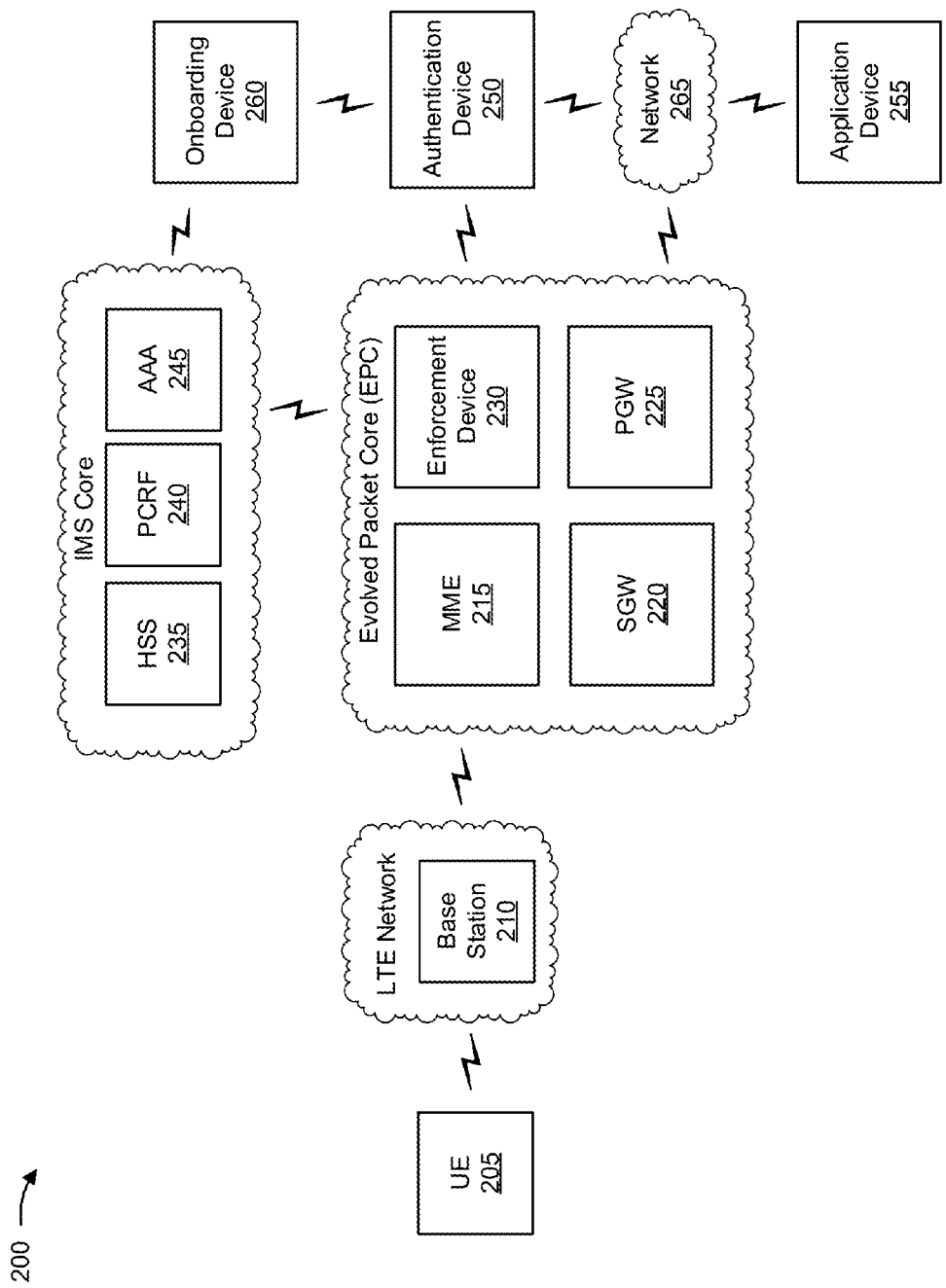
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user equipment (UE) 205; a base station 210; a mobility management entity device (MME) 215; a serving gateway (SGW) 220; a packet data network gateway (PGW) 225; an enforcement device 230; a home subscriber server (HSS) 235; a policy charging and rules function (PCRF) 240; an authentication, authorization, and accounting server (AAA) 245; an authentication device 250; an application device 255; an onboarding device 260; and a network 265. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which UE 205 communicates with the EPC. The EPC may include MME 215, SGW 220, PGW 225, and/or PCRF 240 that enable UE 205 to communicate with network 265 and/or an Internet protocol (IP) multimedia subsystem (IMS) core. The IMS core may include HSS 235, PCRF 240, and/or AAA 245, and may manage device registration and authentication, session initiation, billing, etc., associated with UEs 205. HSS 235 and/or PCRF 240 may reside in the EPC and/or the IMS core.

In some implementations, environment 200 may include an evolved packet system (EPS) that includes a long term evolution (LTE) network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which UE 205 communicates with the EPC. The EPC may include MME 215, SGW 220, PGW 225, and/or PCRF 240 that enable UE 205 to communicate with network 265 and/or an Internet protocol (IP) multimedia subsystem (IMS) core. The IMS core may include HSS 235, PCRF 240, and/or AAA 245, and may manage device registration and authentication, session initiation, billing, etc., associated with UEs 205. HSS 235 and/or PCRF 240 may reside in the EPC and/or the IMS core.

UE 205 may include one or more devices capable of communicating with base station 210. For example, UE 205 may include a wireless communication device, a radiotelephone, a personal communications system (PCS) terminal (e.g., that may combine a cellular radiotelephone with data processing and data communications capabilities), a smart phone, a laptop computer, a tablet computer, a wireless sensor, a wireless measurement device, a remote control device, a smart grid device, and/or a similar device. UE 205 may send traffic to and/or receive traffic from network 265 via base station 210.

Base station 210 may include one or more devices capable of transferring traffic, such as audio, video, text, and/or other traffic, destined for and/or received from UE 205. In some implementations, base station 210 may include an eNB associated with the LTE network that receives traffic from and/or sends traffic to network 265 via SGW 220 and/or PGW 225. Additionally, or alternatively, one or more base stations 210 may be associated with a RAN that is not associated with an LTE network. Base station 210 may send traffic to and/or receive traffic from UE 205 via an air interface. In some implementations, base station 210 may include a small cell base station, such as a base station of a microcell, a picocell, and/or a femtocell.

MME 215 may include one or more devices, such as one or more server devices, capable of managing authentication, activation, deactivation, and/or mobility functions associated with UE 205. In some implementations, MME 215 may perform operations relating to authentication of UE 205. Additionally, or alternatively, MME 215 may facilitate the selection of a particular SGW 220 and/or a particular PGW 225 to serve traffic to and/or from UE 205. MME 215 may perform operations associated with handing off UE 205 from a first base station 210 to a second base station 210 when UE 205 is transitioning from a first cell associated with the first base station 210 to a second cell associated with the second base station 210. Additionally, or alternatively, MME 215 may select another MME (not pictured), to which UE 205 should be handed off (e.g., when UE 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and transfers traffic. In some implementations, SGW 220 may aggregate traffic received from one or more base stations 210 associated with the LTE network, and may send the aggregated traffic to network 265 (e.g., via PGW 225) and/or other network devices associated with the EPC and/or the IMS core. SGW 220 may also receive traffic from network 265 and/or other network devices, and may send the received traffic to UE 205 via base station 210. Additionally, or alternatively, SGW 220 may perform operations associated with handing off UE 205 to and/or from an LTE network.

PGW 225 may include one or more devices capable of providing connectivity for UE 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 265. Additionally, or alternatively, PGW 225 may receive traffic from network 265, and may send the traffic to UE 205 via SGW 220 and base station 210. PGW 225 may record data usage information (e.g., byte usage), and may provide the data usage information to HSS 235.

Enforcement device 230 may include one or more devices capable of receiving, generating, storing, processing, and/or providing information. For example, enforcement device 230 may include a server, a network device (e.g., a router, a firewall, a gateway, a switch, a hub, etc.), or a similar device. Enforcement device 230 may receive information from and/or provide information to one or more devices of environment 200.

HSS 235 may include one or more devices, such as one or more server devices, capable of managing (e.g., receiving, generating, storing, processing, and/or providing) information associated with UE 205. For example, HSS 235 may manage subscription information associated with UE 205, such as information that identifies a subscriber profile of a user associated with UE 205, information that identifies services and/or applications that are accessible to UE 205, location information associated with UE 205, a network identifier (e.g., a network address) that identifies UE 205, information that identifies a treatment of UE 205 (e.g., quality of service information, a quantity of minutes allowed per time period, a quantity of data consumption allowed per time period, etc.), and/or similar information. HSS 235 may provide this information to one or more other devices of environment 200 to support the operations performed by those devices.

PCRF 240 may include one or more network devices, or other types of communication devices. PCRF 240 may store subscriber information, such as voice call and data rate plans or quotas for subscribers. PCRF 240 may provide network control regarding service data flow detection, gating, QoS, and/or flow-based charging. Policies and rules regarding QoS may include policies and rules instructing UE 205 and/or network elements (base station 210, MME 215, SGW 220, PGW 225, etc.) to minimize packet loss, to implement a packet delay budget, to provide a guaranteed bit rate (GBR), to provide a particular latency, to reduce radio frequency (RF) signal congestion, and/or to perform other activities associated with QoS. PCRF 240 may provide policies and rules to other network devices, such as base station 210, SGW 220, PGW 225, or the like, to implement network control. PCRF 240 may determine how a certain service data flow shall be treated, and may ensure that user plane traffic mapping and QoS is in accordance with a user's profile and/or network policies.

AAA 245 may include one or more devices that perform authentication operations for UE 205 and/or a user of UE 205 (e.g., using one or more credentials), may control access, by UE 205, to a service and/or an application (e.g., based on one or more restrictions, such as time-of-day restrictions, location restrictions, single or multiple access restrictions, read/write restrictions, RF access signaling usage restrictions, etc.), may track resources consumed by UE 205 (e.g., a quantity of voice minutes consumed, a quantity of data consumed, a quantity of RF signals transmitted, a quantity of radio access bearers requested and/or established, etc.), and/or may perform similar operations.

Authentication device 250 may include one or more devices capable of receiving, generating, storing, processing, and/or providing information. For example, authentication device 250 may include a server, a network device (e.g., a router, a firewall, a gateway, a switch, a hub, etc.), or a similar device. Authentication device 250 may receive information from and/or provide information to one or more devices of environment 200.

Application device 255 may include one or more devices capable of receiving, generating, storing, processing, and/or providing information. For example, application device 255 may include a communication and computing device, such as a smart phone, a laptop computer, a tablet computer, a desktop computer, a server, or a similar device. Application device 255 may receive information from and/or provide information one or more devices of environment 200.

Onboarding device 260 may include one or more devices capable of receiving, generating, storing, processing, and/or providing information. For example, onboarding device 260 may include a communication and computing device, such as a smart phone, a laptop computer, a tablet computer, a desktop computer, a server, or a similar device. Onboarding device 260 may receive information from and/or provide information one or more devices of environment 200.

Network 265 may include one or more wired and/or wireless networks. For example, network 265 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
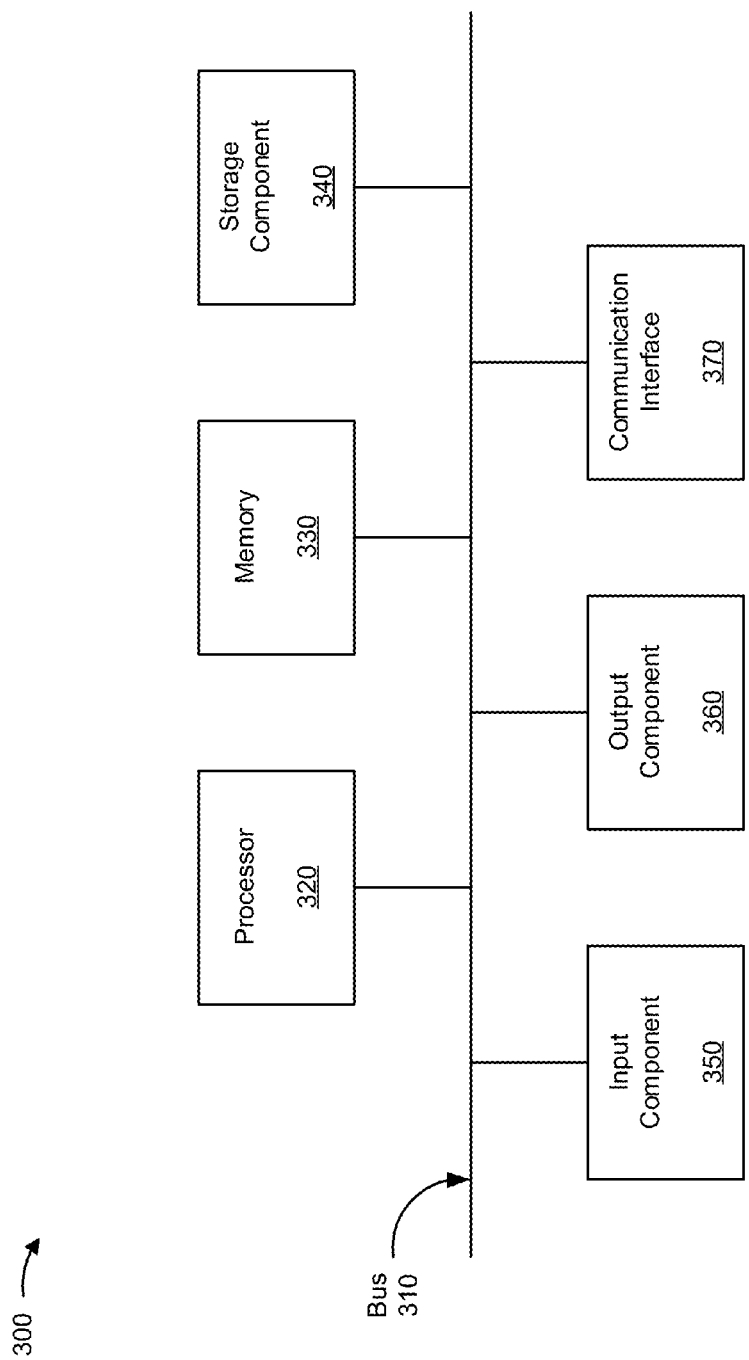
FIG. 3 is a diagram of example components of one or more devices of FIG. 2.

FIG. 3 is a diagram of example components of a device 300. Device 300 may correspond to UE 205, base station 210, MME 215, SGW 220, PGW 225, enforcement device 230, HSS 235, PCRF 240, AAA 245, authentication device 250, application device 255, and/or onboarding device 260.

In some implementations, UE 205, base station 210, MME 215, SGW 220, PGW 225, enforcement device 230, HSS 235, PCRF 240, AAA 245, authentication device 250, application device 255, and/or onboarding device 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
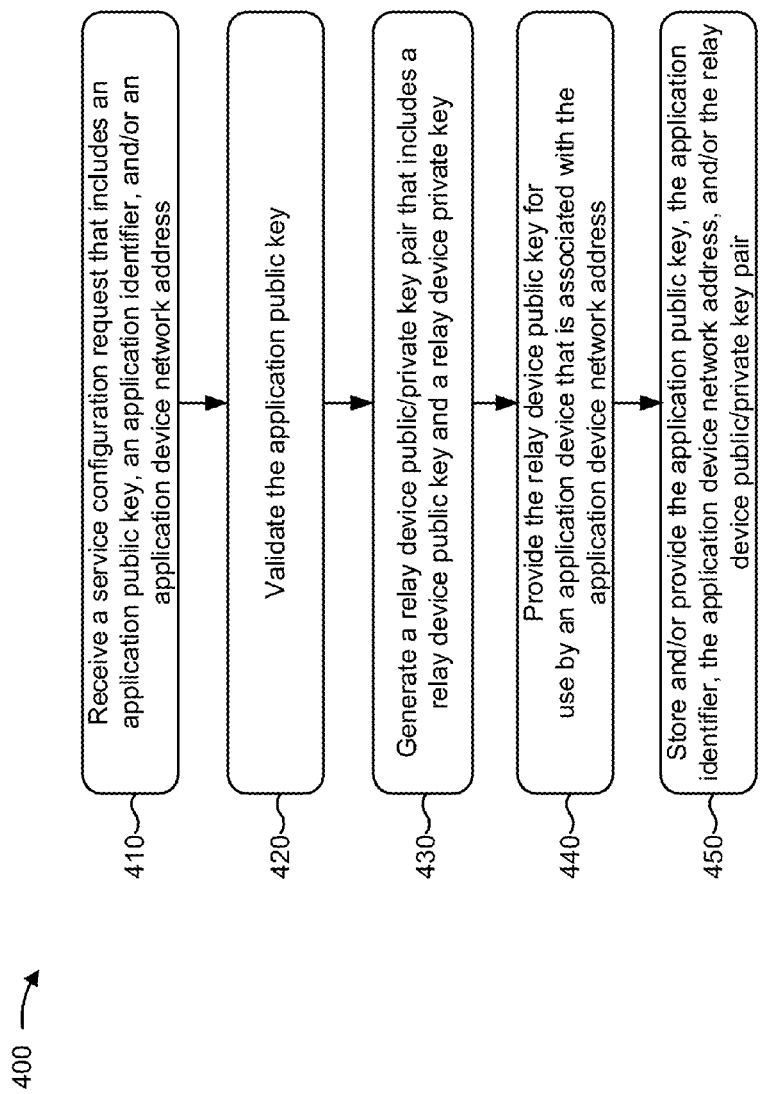
FIG. 4 is a flow chart of an example process for configuring a secure authentication service.

FIG. 4 is a flow chart of an example process 400 for configuring a secure authentication service. In some implementations, one or more process blocks of FIG. 4 may be performed by authentication device 250. In some implementations, one or more process blocks of FIG. 4 may be performed by another device or a group of devices separate from or including authentication device 250, such as UE 205, base station 210, MME 215, SGW 220, PGW 225, enforcement device 230, HSS 235, PCRF 240, AAA 245, application device 255, and onboarding device 260.

As shown in FIG. 4, process 400 may include receiving a service configuration request that includes an application public key, an application identifier, and/or an application device network address (block 410). For example, authentication device 250 may receive a service configuration request to configure a secure authentication service. Authentication device 250 may receive the service configuration request from onboarding device 260, or another device. A user associated with the application (e.g., an administrator, a network engineer, etc.) may input information for the service configuration request to onboarding device 260, in some implementations. Additionally, or alternatively, onboarding device 260 may generate information for the service configuration request (e.g., the application public key and/or the application identifier).

The service configuration request may include an application identifier, an application device network address, and/or an application public key. The application identifier may include a string of one or more characters that identifies an application to be run by one or more UEs 205. In some implementations, the application identifier may be unique (e.g., may not be shared by two or more applications). In some implementations, the application identifier may be generated by authentication device 250 (e.g., based on receiving the service configuration request). The application device network address may include a network address associated with application device 255 (e.g., an Internet Protocol (IP) address, a network port, an IP address/network port combination, a Uniform Resource Identifier (URI), a Uniform Resource Locator (URL), etc.).

The application public key may include a cryptographic key for an encryption system (e.g., an asymmetric encryption system, a symmetric encryption system, etc.), based on which other devices may authenticate application device 255. For example, application device 255 may store an application private key counterpart to the application public key. Application device 255 may provide the application public key to another device. The other device may generate an encrypted message based on the application public key, and may provide the encrypted message to application device 255. Application device 255 may decrypt the message based on the application private key, and may thereby determine that the other device is to be trusted. For example, the message may contain a shared key to use for communications between application device 255 and the other device, may contain a particular flag indicating that the other device is to be trusted, or the like. Additionally, or alternatively, application device 255 may encrypt a message based on the application private key, and may provide the encrypted message to another device that holds the application public key. The other device may decrypt the message using the application public key.

As further shown in FIG. 4, process 400 may include validating the application public key (block 420). For example, authentication device 250 may validate the application public key to determine whether the application public key is valid and/or whether the application public key originates from onboarding device 260. In some implementations, authentication device 250 may validate the application public key based on information associated with the application public key. For example, onboarding device 260 may provide a digital certificate in association with the application public key. The digital certificate may identify onboarding device 260, and may include a digital signature from an entity that has verified that the contents of the digital certificate are valid. In this way, authentication device 250 validates the application public key, which improves network security.

As further shown in FIG. 4, process 400 may include generating an authentication device public/private key pair that includes an authentication device public key and an authentication device private key (block 430). For example, authentication device 250 may generate an authentication device public/private key pair. The authentication device public/private key pair may include an authentication device public key and an authentication device private key. Based on the authentication device public key and/or the authentication device private key, authentication device 250 may communicate securely with another device (e.g., application device 255, etc.), as described in more detail below.

In some implementations, authentication device 250 may generate and/or store multiple authentication device public/private key pairs, and may assign a particular authentication device public/private key pair to the secure authentication service based on the service configuration request. For example, authentication device 250 may generate authentication device public/private key pairs periodically, based on a quantity of stored authentication device public/private key pairs, or the like. As another example, authentication device 250 may receive the authentication device public/private key pairs from another device that generates the authentication device public/private key pairs, and may store the authentication device public/private key pairs. Authentication device 250 may assign one of the authentication device public/private key pairs to the secure authentication service based on the service configuration request. In this way, authentication device 250 conserves processor power by storing authentication device public/private key pairs for later use.

As further shown in FIG. 4, process 400 may include providing the authentication device public key for use by an application device that is associated with the application device network address (block 440). For example, authentication device 250 may provide the authentication device public key for use by application device 255. In some implementations, authentication device 250 may provide the authentication device public key to application device 255. Additionally, or alternatively, authentication device 250 may provide the authentication device public key to another device (e.g., onboarding device 260, etc.), and the other device may provide the authentication device public key to application device 255. Application device 255 may use the authentication device public key to encrypt information to be securely decrypted by authentication device 250 using the corresponding authentication device private key, as described in more detail below.

As further shown in FIG. 4, process 400 may include storing and/or providing the application public key, the application identifier, the application device network address, and/or the authentication device public/private key pair (block 450). For example, authentication device 250 may store and/or provide the application public key, the application identifier, the application device network address, and/or the authentication device public/private key pair. In some implementations, authentication device 250 may provide information to enforcement device 230. For example, authentication device 250 may provide the application identifier and/or the application device network address to enforcement device 230.

Additionally, or alternatively, authentication device 250 may provide information to onboarding device 260. For example, authentication device 250 may provide the application identifier, the application device network address, and/or the authentication device public key to onboarding device 260. Onboarding device 260 may provide the application identifier and/or the application device network address to enforcement device 230, and/or may provide the authentication device public key to onboarding device 260. In some implementations, authentication device 250 may store information. For example, authentication device 250 may store the authentication device public/private key pair, the application public key, the application identifier, and/or the application device network address. Authentication device 250 may use the application public key and/or the authentication device private key to establish a secure session with application device 255, which improves network security.

Application device 255 may provide information identifying UEs 205 that are associated with the secure authentication service. For example, authentication device 250 may provide, to enforcement device 230 and/or authentication device 250, one or more device identifiers that are associated with UEs 205 that are permitted to access application device 255. In some implementations, application device 255 may provide a set of device identifiers in association with an application identifier, which permits application device 255 to specify that UEs 205 associated with the application identifier (e.g., that are running an application associated with the application identifier) may access application device 255. In this way, application device 255 improves network security by enabling enforcement device 230 and/or authentication device 250 to control which UEs 205 can access application device 255 despite the UEs 205 running an application that can grant access to application device 255.

In some implementations, application device 255 may provide a first set of device identifiers with a first application identifier, and may provide a second set of device identifiers with a second application identifier. In this way, application device 255 increases network security by preventing a UE 205 that is associated with a device identifier, of the first set of device identifiers (e.g., or the second set of device identifiers), from gaining access to application device 255 using the second application (e.g., or the first application, respectively).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
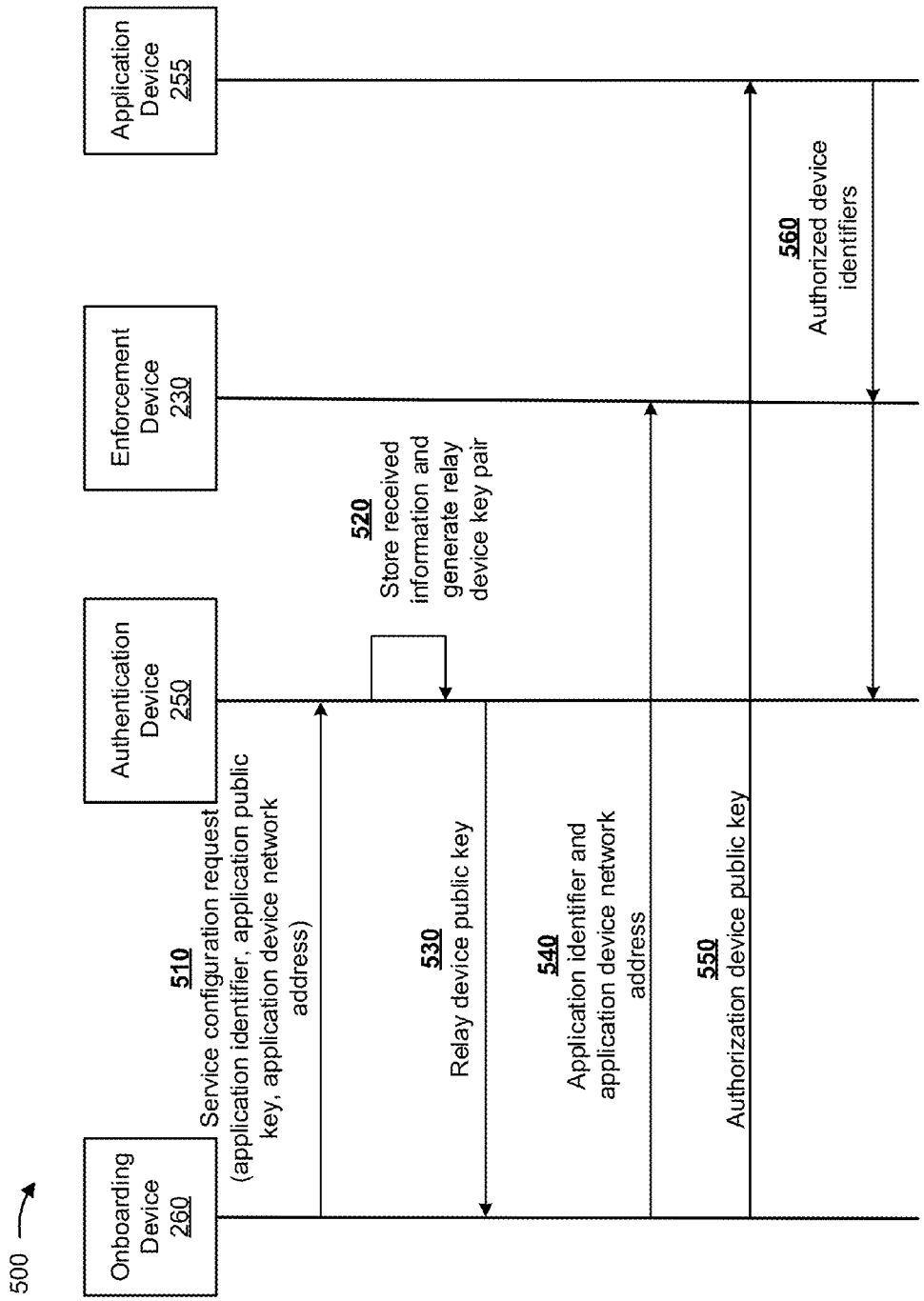
FIG. 5 is a signal diagram of an example implementation relating to the example process shown in FIG. 4.

FIG. 5 is a signal diagram of an example implementation 500 relating to example process 400 shown in FIG. 4. FIG. 5 shows an example of configuring a secure authentication service. As shown in FIG. 5, and by reference number 510, onboarding device 260 may provide a service configuration request to authentication device 250. As further shown, the service configuration request may include an application identifier, an application public key, and an application device network address. As shown by reference number 520, authentication device 250 may store the application identifier, the application public key, and the application device network address. As further shown, authentication device 250 may generate an authentication device public/private key pair for the secure data upload/download service.

As shown by reference number 530, authentication device 250 may provide an authentication device public key, of the authentication device public/private key pair, to onboarding device 260. As shown by reference number 540, onboarding device 260 may provide the application identifier and the application device network address to enforcement device 230. As shown by reference number 550, onboarding device 260 may provide the authentication device public key to application device 255. As shown by reference number 560, application device 255 may provide authorized device identifiers to authentication device 250 and/or enforcement device 230.

As indicated above, FIG. 5 is provided merely as an example. Other examples are possible and may differ from what was described with regard to FIG. 5.

Figure 6:
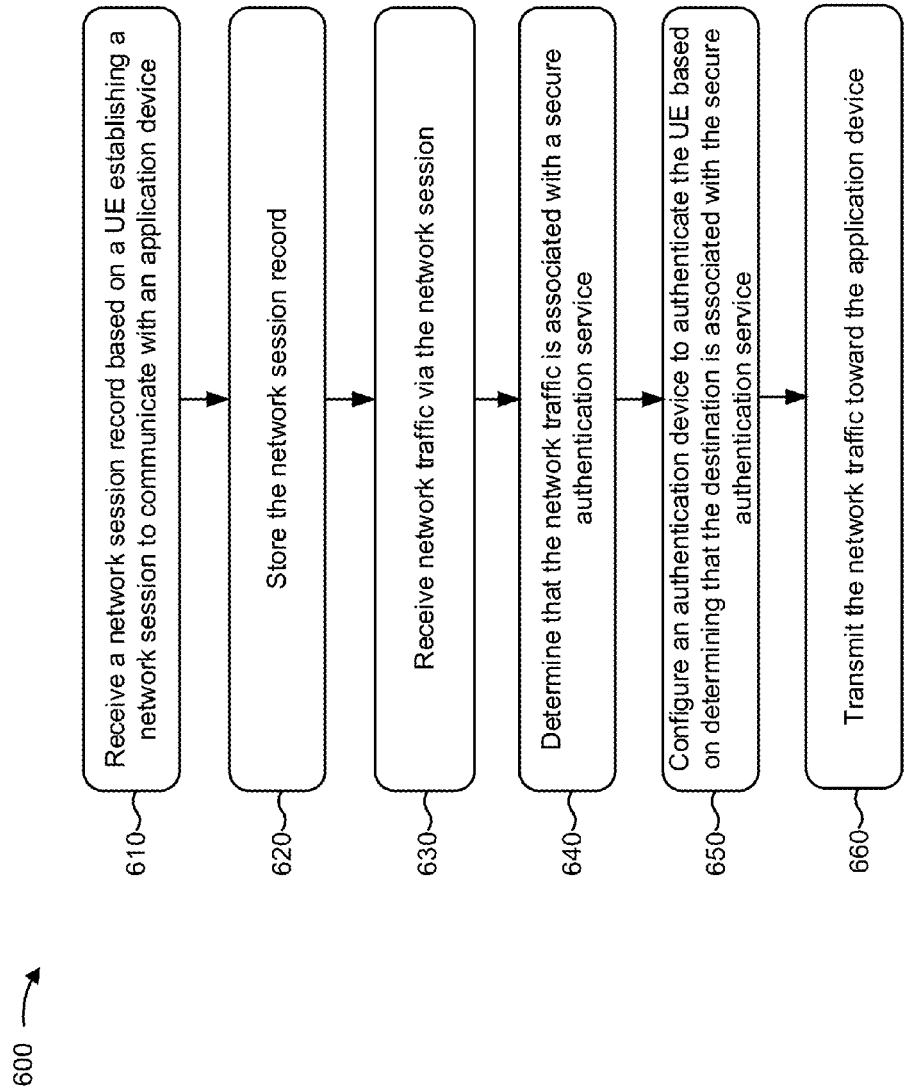
FIG. 6 is a flow chart of an example process for configuring an authentication device based on establishing a network session.

FIG. 6 is a flow chart of an example process 600 for configuring an authentication device based on establishing a network session. In some implementations, one or more process blocks of FIG. 6 may be performed by enforcement device 230. In some implementations, one or more process blocks of FIG. 6 may be performed by another device or a group of devices separate from or including enforcement device 230, such as UE 205, base station 210, MME 215, SGW 220, PGW 225, HSS 235, PCRF 240, AAA 245, authentication device 250, application device 255, and onboarding device 260.

As shown in FIG. 6, process 600 may include receiving a network session record based on a UE establishing a network session to communicate with an application device (block 610). For example, enforcement device 230 may receive a network session record (e.g., from UE 205, from PGW 225, etc.). Enforcement device 230 may receive the network session record based on UE 205 establishing a network session (e.g., a Session Initiation Protocol (SIP) session, a Hypertext Transfer Protocol (HTTP) session, a secure HTTP session, etc.) with PGW 225. UE 205 may establish the network session to communicate with application device 255, as described in more detail below.

The network session record may include, for example, a session identifier (e.g., a string of one or more characters identifying the network session), a network address associated with UE 205 (e.g., an IP address, a network port, a combination of an IP address and a network port, a URL, a URI, etc.), a network address associated with application device 255 (e.g., an IP address, a network port, a combination of an IP address and a network port, a URL, a URI, etc.), a device identifier associated with UE 205, a time at which the network session was established, or the like.

As further shown in FIG. 6, process 600 may include storing the network session record (block 620). For example, enforcement device 230 may store the network session record. In some implementations, enforcement device 230 may store all of the information included in the network session record. In some implementations, enforcement device 230 may store a subset of the information included in the network session record (e.g., the session identifier, the network address associated with UE 205 and/or application device 255, the device identifier associated with UE 205, etc.).

As further shown in FIG. 6, process 600 may include receiving network traffic via the network session (block 630). For example, enforcement device 230 may receive network traffic via the network session. Enforcement device 230 may receive the network traffic from UE 205 (e.g., via PGW 225) en route to application device 255. The network traffic may include, for example, a packet, a series of packets, a data flow, or the like. In some implementations, the network traffic may include information identifying a source of the network traffic (e.g., UE 205, based on a device identifier and/or a network address), a destination of the network traffic (e.g., application device 255, based on a device identifier and/or a network address), a session identifier identifying the network session, an application identifier identifying an application that caused UE 205 to provide the network traffic, or the like.

As further shown in FIG. 6, process 600 may include determining that the network traffic is associated with a secure authentication service (block 640). For example, enforcement device 230 may determine that the network traffic is associated with a secure authentication service. Enforcement device 230 may determine that the destination is associated with the secure authentication service based on stored information. For example, onboarding device 260 may provide authentication service information to enforcement device 230, and enforcement device 230 may determine that the destination is associated with the secure authentication service based on the secure authentication service information (e.g., based on an application identifier associated with the network traffic, a destination network address of the network traffic, a device identifier associated with the network traffic, a source network address of the network traffic, etc.).

As further shown in FIG. 6, process 600 may include configuring an authentication device to authenticate the UE based on determining that the destination is associated with the secure authentication service (block 650). For example, enforcement device 230 may configure authentication device 250 to authenticate UE 205 based on determining that the network traffic is associated with the secure authentication service. Enforcement device 230 may configure authentication device 250 to authenticate UE 205 based on an authentication record. For example, enforcement device 230 may provide an authentication record to authentication device 250, and authentication device 250 may authenticate UE 205 based on the authentication record.

The authentication record may include information identifying, for example, a network address associated with UE 205, a network address associated with application device 255, a device identifier associated with UE 205, an application identifier, a session identifier, or the like. In some implementations, the authentication record may include multiple device identifiers, application identifiers, session identifiers, network addresses, or the like. For example, enforcement device 230 may receive network session records relating to multiple UEs 205, multiple network sessions, multiple applications, multiple network addresses, or the like, and may generate an authentication record that identifies each UE 205, each network session, each application, or the like. In this way, enforcement device 230 conserves network bandwidth and processor resources of enforcement device 230 and/or authentication device 250.

As further shown in FIG. 6, process 600 may include transmitting the network traffic toward the application device (block 660). For example, based on determining that the network traffic is associated with the secure authentication service, enforcement device 230 may transmit the network traffic toward application device 255. In this way, enforcement device 230 configures authentication device 250 to provide a secure authentication service for network traffic associated with an application, and provides network traffic from UE 205 to application device 255.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
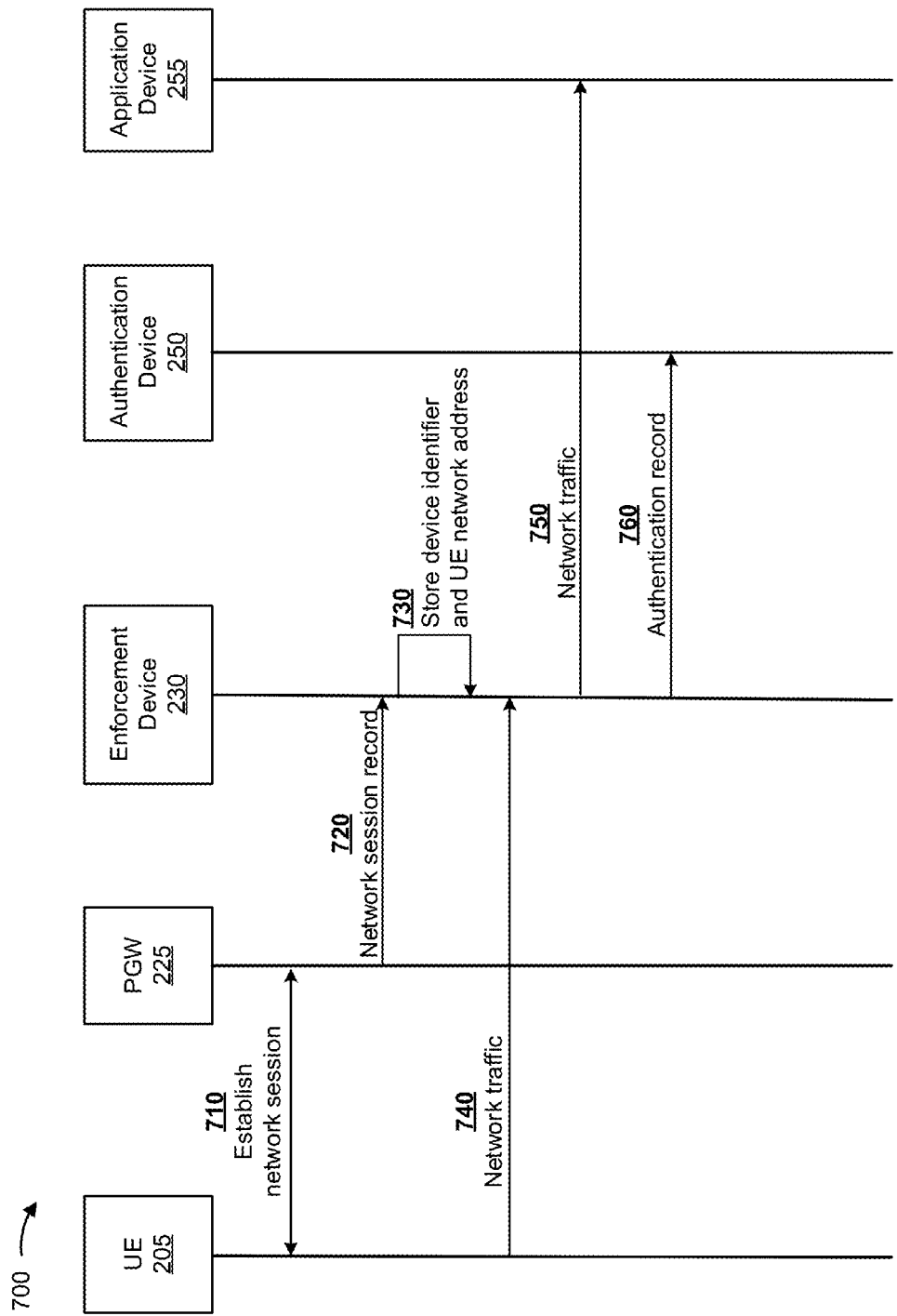
FIG. 7 is a signal diagram of an example implementation relating to the example process shown in FIG. 6.

FIG. 7 is a signal diagram of an example implementation 700 relating to example process 600 shown in FIG. 6. FIG. 7 shows an example of configuring an authentication device based on establishing a network session. As shown in FIG. 7, and by reference number 710, UE 205 may establish a network session with PGW 225. As shown by reference number 720, PGW 225 may provide a network session record to enforcement device 230 based on establishing the network session with UE 205. As shown by reference number 730, enforcement device 230 may store a device identifier associated with UE 205 and a network address associated with UE 205.

As shown by reference number 740, UE 205 may transmit a packet via the network session to enforcement device 230. As shown by reference number 750, enforcement device 230 may transmit the packet to authentication device 250 (e.g., based on determining that UE 205 is associated with the secure authentication service and permitted to access authentication device 250, as also described in connection with FIGS. 1C and 6, above). As shown by reference number 760, enforcement device 230 may transmit an authentication record to authentication device 250 to enable authentication device 250 to authenticate UE 205.

As indicated above, FIG. 7 is provided merely as an example. Other examples are possible and may differ from what was described with regard to FIG. 7.

Figure 8:
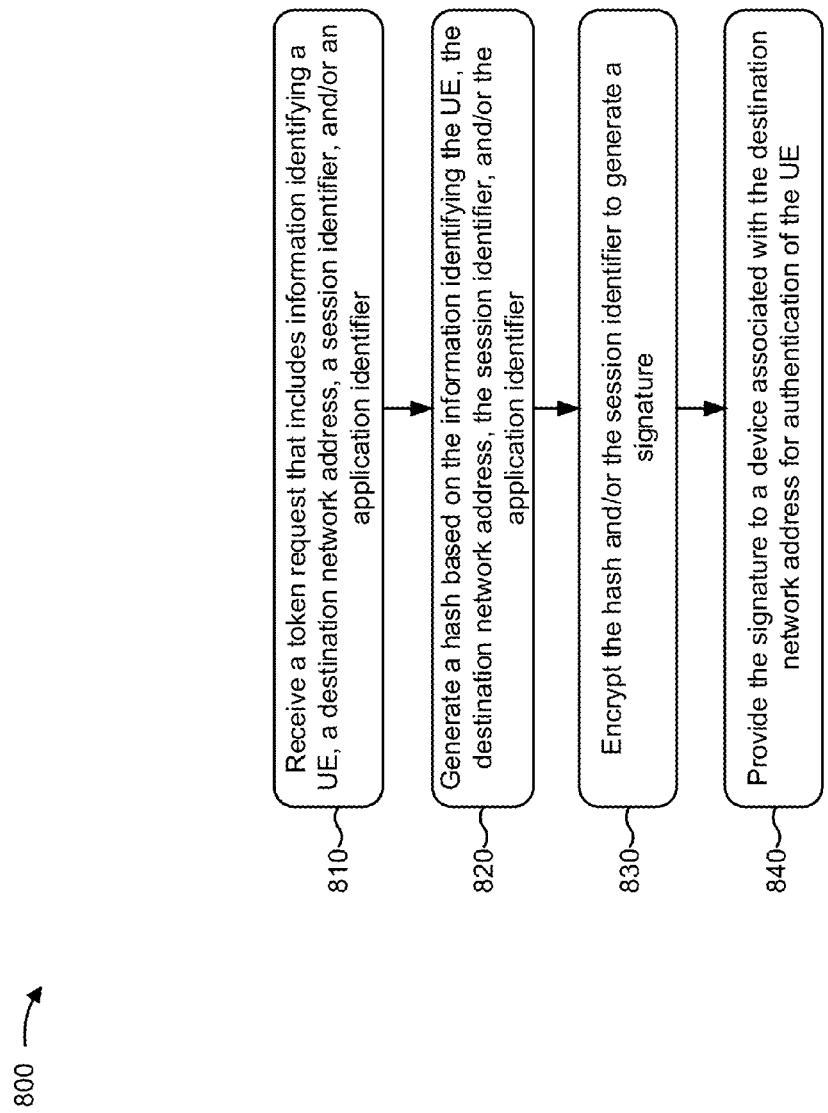
FIG. 8 is a flow chart of an example process for authenticating a UE based on a secure authentication service.

FIG. 8 is a flow chart of an example process 800 for authenticating a UE based on a secure authentication service. In some implementations, one or more process blocks of FIG. 8 may be performed by authentication device 250. In some implementations, one or more process blocks of FIG. 8 may be performed by another device or a group of devices separate from or including authentication device 250, such as UE 205, base station 210, MME 215, SGW 220, enforcement device 230, PGW 225, HSS 235, PCRF 240, AAA 245, application device 255, and onboarding device 260.

As shown in FIG. 8, process 800 may include receiving a token request that includes information identifying a UE, a destination network address, a session identifier, and/or an application identifier (block 810). For example, authentication device 250 may receive a token request from UE 205. The token request may include an application identifier, a session identifier, a device identifier associated with UE 205, a network address associated with UE 205, a network address associated with application device 255, or the like. The token request may request a token for use by UE 205 to access application device 255. For example, in a situation where application device 255 successfully authenticates UE 205 (e.g., based on a signature received from authentication device 250 and/or one or more application credentials received from UE 205), application device 255 may provide a token to UE 205, and UE 205 may use the token to access application device 255.

Authentication device 250 may receive the token request based on UE 205 attempting to access application device 255. For example, UE 205 may provide an access request to application device 255, and application device 255 may determine that the access request does not include a token. Application device 255 may deny UE 205 access to application device 255 based on the access request not including the token. In some implementations, application device 255 may generate the token request, and may provide the token request to UE 205. In such implementations, UE 205 may provide the token request, received from application device 255, to authentication device 250. In this way, application device 255 conserves processor resources of UE 205. Additionally, or alternatively, UE 205 may receive a message from application device 255 indicating that authentication of the access request failed, and may generate the token request to provide to authentication device 250. In this way, UE 205 conserves processor resources of application device 255.

In some implementations, the session identifier may be encrypted. For example, application device 255 may encrypt the session identifier (e.g., using an authentication device public key), and may provide an encrypted session identifier to UE 205 (e.g., in a token request). In this way, application device 255 improves security of the secure authentication process by preventing parties that do not have a corresponding private key from obtaining the session identifier, or from tampering with the session identifier, via UE 205.

As further shown in FIG. 8, process 800 may include generating a hash based on the information identifying the UE, the destination network address, the session identifier, and/or the application identifier (block 820). For example, authentication device 250 may generate a hash based on the information identifying UE 205 (e.g., the device identifier, the network address, etc.), the destination network address (e.g., the network address associated with application device 255), the session identifier (e.g., after decrypting the session identifier, etc.), and/or the application identifier. Authentication device 250 may use, for example, a message-digest 5 (MD5) algorithm, a Secure Hash Algorithm 1 (SHA-1) algorithm, or the like, to generate the hash. The hash may include, for example, a message authentication code (MAC) (e.g., an HMAC, etc.), or the like. Authentication device 250 may generate the hash for use by application device 255 to authenticate UE 205, which improves security of application device 255.

As further shown in FIG. 8, process 800 may include encrypting the hash and/or the session identifier to generate a signature (block 830). For example, application device 255 may encrypt the hash and/or the session identifier to generate a signature. In some implementations, application device 255 may encrypt the hash and/or the session identifier using a particular security key. For example, application device 255 may use an application public key to encrypt the hash, which prevents parties that do not have a corresponding application private key (e.g., parties other than application device 255) from decrypting and/or obtaining the session identifier and/or the hash.

As further shown in FIG. 8, process 800 may include providing the signature to a device associated with the destination network address for authentication of the UE (block 840). For example, authentication device 250 may provide the signature to application device 255. Application device 255 may use the signature to authenticate UE 205. For example, based on receiving the signature, application device 255 may decrypt the signature (e.g., using an application private key corresponding to an application public key that authentication device 250 used to encrypt the signature) to obtain the session identifier and the hash. Application device 255 may determine that the session identifier matches a network session between application device 255 and UE 205, and may authenticate UE 205 based on the hash.

To authenticate UE 205, application device 255 may generate a comparison hash, and may compare the comparison hash to the received hash. For example, application device 255 may store information identifying a network address associated with UE 205, a device identifier associated with UE 205, a network address associated with application device 255, a session identifier, an application identifier, or the like, and may generate a comparison hash based on the stored information. If the comparison hash matches the received hash, application device 255 may successfully authenticate UE 205 with regard to the secure authentication service. If the comparison hash does not match the received hash, application device 255 may fail to authenticate UE 205, and may deny UE 205 access to application device 255. By using a hash to authenticate UE 205, application device 255 improves security of the secure authorization process by preventing malicious parties from decrypting the hash to obtain the information based on which the hash was generated.

In some implementations, application device 255 may authenticate UE 205 based on a token. For example, in a situation where application device 255 successfully authenticates UE 205 based on a hash, application device 255 may provide a token to UE 205, and may permit UE 205 to access application device 255 when application device 255 successfully authenticates the token. In some implementations, application device 255 may provide the token based on one or more additional credentials, as described in more detail below.

In some implementations, after successfully authenticating UE 205 based on a hash, application device 255 may request one or more application credentials from UE 205 before providing a token to UE 205. For example, a user of UE 205 may input the one or more application credentials, and application device 255 may successfully authenticate, or fail to authenticate, UE 205 based on the one or more application credentials, as also described in connection with FIGS. 1F and 9. In a situation where application device 255 successfully authenticates UE 205 based on the one or more application credentials, application device 255 may provide a token to UE 205, and may permit UE 205 to access application device 255 based on the token. In this way, application device 255 provides additional security for the secure authentication service.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
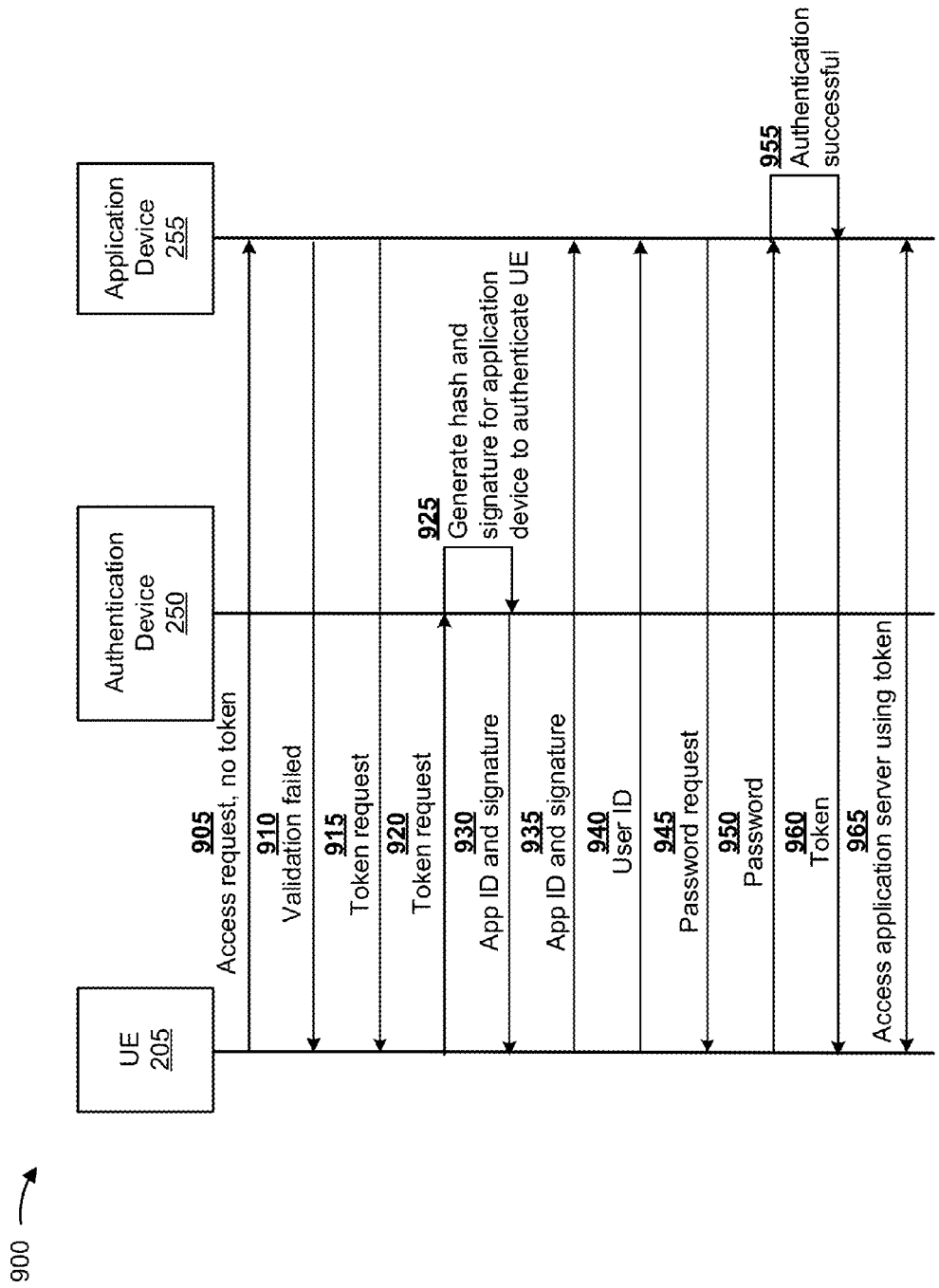
FIG. 9 is a signal diagram of an example implementation relating to the example process shown in FIG. 8.

FIG. 9 is a signal diagram of an example implementation 900 relating to example process 800 shown in FIG. 8. FIG. 9 shows an example of authenticating a UE based on a secure authentication service. As shown in FIG. 9, and by reference number 905, UE 205 may provide an access request that does not include a token to application device 255. As shown by reference number 910, application device 255 may transmit a message to UE 205 indicating that validation of the access request failed (e.g., based on the access request not including the token). As shown by reference number 915, application device 255 may transmit a token request to UE 205. As shown by reference number 920, UE 205 may transmit the token request to authentication device 250.

As shown by reference number 925, authentication device 250 may generate a hash, and may generate a signature based on the hash, for use by application device 255 to authenticate UE 205. For a more detailed description of the operations shown by reference number 925, refer to FIGS. 1E and 8, above. As shown by reference number 930, authentication device 250 may transmit an application identifier (e.g., that was received in connection with the token request) and the signature to UE 205. As shown by reference number 935, UE 205 may transmit the application identifier and the signature to application device 255.

As shown by reference number 940, UE 205 may provide a user identifier (e.g., a credential) to application device 255 (e.g., based on receiving a request for a credential from application device 255 after application device 255 authenticates the signature, as described in more detail elsewhere herein). As shown by reference number 945, UE 205 may receive a password request (e.g., a request for another credential) from application device 255 (e.g., based on application device 255 successfully validating the user identifier). As shown by reference number 950, UE 205 may provide a password to application device 255. As shown by reference number 955, application device 255 may determine that authentication of UE 205 is successful. As shown by reference number 960, application device 255 may provide the token to UE 205. As shown by reference number 965, UE 205 may access application device 255 using the token.

As indicated above, FIG. 9 is provided merely as an example. Other examples are possible and may differ from what was described with regard to FIG. 9.

In this way, an enforcement device and/or an authentication device reduce complexity and expense associated with implementing high-security communication protocols between a UE and an application device, thereby improving security of a cellular network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
   one or more processors to:
   receive a request from a second device, the request including a device identifier associated with the second device and an application identifier associated with an application executing on the second device, the second device providing the request to obtain a signature based on which to access a third device via the application;
   receive information indicating that the application identifier and the device identifier are associated with a secure authentication service, the second device providing an authentication device public key to the third device,
   determine, that the application identifier and the device identifier are associated with the secure authentication service,
   generate a signature based on determining that the application identifier and the device identifier are associated with the secure authentication service, the signature being generated by using the authentication device public key; and provide the signature to the third device,
   the signature permitting the third device to selectively permit or deny access by the second device based on a result of authenticating the signature, access being permitted when the third device successfully authenticates the signature, and
   access being denied when the third device fails to authenticate the signature.

2. The first device of claim 1, where
   the authentication device public key is part of a public key/private key pair, and
   the third device storing a private key of the public key/private key pair.

3. The first device of claim 1, where the one or more processors, when generating the signature, are to:
   generate a hash based on information associated with the second device, the third device, or the secure authentication service;
   encrypt the hash and the information using the authentication device public key to generate the signature; and
   provide the signature to the third device with information for identifying a private key associated with the authentication device public key,
   the authentication device public key permitting the third device to decrypt the signature.

4. The first device of claim 3, where the one or more processors, when generating the hash, are to:
   generate the hash based on at least one of:
   a network address associated with the second device,
   the network address associated with the third device,
   the device identifier,
   a session identifier that identifies a network session relating to the second device or the third device, or
   the application identifier.

5. The first device of claim 1, where the one or more processors are to:
   receive an authentication record identifying the device identifier or the application identifier; and
   where the one or more processors, when determining that the application identifier and the device identifier are associated with the secure authentication service, are to:
   determine that the application identifier and the device identifier are associated with the secure authentication service based on the authentication record.

6. The first device of claim 5, where the one or more processors, when receiving the authentication record, are to:
   receive the authentication record based on a network session being established between the second device and the third device.

7. The first device of claim 1, where the one or more processors are to:
   receive, from the third device and before receiving the request, information identifying the device identifier; and
   where the one or more processors, when determining that the device identifier is associated with the secure authentication service, are to:
   determine that the device identifier is associated with the secure authentication service based on the information identifying the device identifier.

8. The first device of claim 1, where the one or more processors, when receiving the request, are to:
   receive the request based on the application associated with the second device causing the second device to attempt to access the third device.

9. A non-transitory computer-readable medium storing instructions, the instructions comprising:
   one or more instructions that, when executed by one or more processors of a first device, cause the one or more processors to:
   receive a request from a second device,
   the request including a device identifier associated with the second device and an application identifier associated with an application executing on the second device, and the request being transmitted by the second device to obtain a signature, based on which to access a third device;

receive information indicating that the application identifier and the device identifier are associated with a secure authentication service,
the second device providing an authentication device public key to the third device;

determine, that the application identifier and the device identifier are associated with the secure authentication service;

generate a signature based on determining that the device identifier is associated with the secure authentication service,
the signature being generated by using the authentication device public key; and provide the signature to the third device,
the signature permitting the third device to selectively permit or deny access by the second device based on a result of authenticating the signature,
access being permitted when the third device successfully authenticates the signature, and
access being denied when the third device fails to authenticate the signature.

10. The computer-readable medium of claim 9, where the one or more instructions, that cause the one or more processors to determine that the device identifier is associated with the secure authentication service, cause the one or more processors to:
determine that the device identifier is associated with the secure authentication service based on receiving information indicating that the device identifier is associated with the secure authentication service,
the information indicating that the device identifier is associated with the secure authentication service being received before the request.

11. The computer-readable medium of claim 9, where the one or more instructions, that cause the one or more processors to receive the request, cause the one or more processors to:
receive the request based on the application associated with the second device causing the second device to attempt to access the third device.

12. The computer-readable medium of claim 9, where the authentication device public key is part of a public key/private key pair; and
where the one or more instructions, that cause the one or more processors to provide the signature, cause the one or more processors to:
provide information identifying the public key/private key pair.

13. The computer-readable medium of claim 9, where the one or more instructions, when executed by the one or more processors, cause the one or more processors to:
receive an authentication record based on a network session being established between the second device and the third device,
the authentication record identifying:
a network address associated with the second device,
the network address associated with the third device,
the device identifier,
a session identifier associated with the network session, or
the application identifier associated with the application executing on the second device; and where the one or more instructions, that cause the one or more processors to determine that the device identifier is associated with the secure authentication service, cause the one or more processors to:
determine that the network address associated with the second device, the network address associated with the third device, the device identifier, the network session identifier, or the application identifier are associated with the secure authentication service based on the authentication record.

14. The computer-readable medium of claim 13, where the one or more instructions, that cause the one or more processors to generate the signature, cause the one or more processors to:
generate the signature based on the network address associated with the second device, the network address associated with the third device, the device identifier, the network session identifier, and the application identifier.

15. The non-transitory computer-readable medium of claim 9, where the one or more instructions, that cause the one or more processors to provide the signature, cause the one or more processors to:
provide the signature to the second device for the second device to provide to the third device.

16. A method, comprising:
receiving, by a first device, a request from a second device,
the request including a device identifier associated with the second device and an application identifier associated with an application executing on the second device,
the second device providing the request to obtain a signature based on which to access a third device via the application;
receiving, by the first device, information indicating that the application identifier and the device identifier are associated with a secure authentication service,
the second device providing an authentication device public key to the third device;
determining, that the application identifier and the device identifier are associated with the secure authentication service;
generating, by the first device, a signature based on determining that the application identifier and the device identifier are associated with the secure authentication service,
the signature being generated by using the authentication device public key; and providing, by the first device, the signature to the third device,
the signature permitting the third device to selectively permit or deny access by the second device based on a result of authenticating the signature,
access being permitted when the third device successfully authenticates the signature, and
access being denied when the third device fails to authenticate the signature.

17. The method of claim 16, where providing the signature comprises:
providing the signature to the second device for the second device to provide to the third device.

18. The method of claim 16, where
the authentication device public key is part of a public key/private key pair, and
the third device storing a private key of the public key/private key pair.

19. The method of claim 16, where receiving the request comprises:
- receiving the request based on the third device failing to validate an access request from the second device,
- the access request being provided to the third device to cause the third device to permit the second device to access the third device.

20. The method of claim 16, where providing the signature comprises:
- providing the signature to permit the third device to provide a token to the second device,
- the token, when provided to the third device by the second device in an access request,
- permitting the third device to permit the second device to access the third device.

* * * * *